United States Patent [19]

Brower et al.

[11] Patent Number: 4,953,483
[45] Date of Patent: Sep. 4, 1990

[54] AUTOMATIC QUILTING MACHINE AND METHOD FOR SPECIALIZED QUILTING OF PATTERNS WITH SEPARATE COMPUTERS TO CONTROL THE STITCHING AND TABLE MOVEMENT FUNCTIONS

[75] Inventors: David Brower, Tarzana; Thomas K. Jernigan, North Hollywood, both of Calif.

[73] Assignee: TD Quilting Machinery, Burbank, Calif.

[21] Appl. No.: 389,892

[22] Filed: Aug. 4, 1989

[51] Int. Cl.⁵ .............................. D05B 21/00
[52] U.S. Cl. .................. 112/119; 112/121.12; 112/262.3
[58] Field of Search ........... 112/119, 117, 118, 121.12, 112/103, 121.11, 262.3, 266.1, 102

[56] References Cited

U.S. PATENT DOCUMENTS

| | | | |
|---|---|---|---|
| 1,958,893 | 5/1934 | Kintner | 358/108 X |
| 3,312,184 | 4/1967 | Cash | 112/118 |
| 3,377,968 | 4/1968 | Story | 112/118 |
| 3,500,777 | 3/1970 | Kalning | 112/118 |
| 3,757,710 | 9/1973 | Landoni | 112/118 |
| 4,188,893 | 2/1980 | Shimazaki | 112/121.11 |
| 4,262,613 | 4/1981 | Landoni | 112/118 |
| 4,309,950 | 1/1982 | Franklin | 112/121.12 X |
| 4,385,570 | 5/1983 | Yanagi | 112/121.12 |
| 4,388,882 | 6/1983 | Yamamoto et al. | 112/121.12 |
| 4,403,559 | 9/1983 | Hirose | 112/121.12 |
| 4,429,364 | 1/1984 | Maruyama | 112/121.11 X |
| 4,498,404 | 2/1985 | Sadeh | 112/121.12 |
| 4,526,116 | 7/1985 | Mannel | 112/121.12 X |
| 4,582,006 | 4/1986 | Yamane | 112/121.12 |
| 4,583,181 | 4/1986 | Gerber | 364/470 |
| 4,616,583 | 10/1986 | Takano et al. | 112/121.12 |
| 4,660,484 | 4/1987 | Yasui | 112/121.12 X |
| 4,669,405 | 6/1987 | Resta | 112/103 X |
| 4,674,421 | 6/1987 | Iwase | 112/121.12 |
| 4,704,977 | 11/1987 | Nukushina | 112/121.12 X |
| 4,759,302 | 7/1988 | Yanagi | 112/121.12 |
| 4,784,071 | 11/1988 | Sadeh | 112/121.12 |

Primary Examiner—Peter Nerbun
Attorney, Agent, or Firm—Thomas I. Rozsa

[57] ABSTRACT

An automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction, either through a manually operated automatic joystick or mouse or through an automatic remote control directed by a computer. The sewing machine function is controlled by one computer connected to the sewing machine head and the quilting table motion in the X-direction, Y-direction, and X-Y direction is controlled by a separate computer. When it is desired to change a sewing machine computer function such as a stitch or accessory functions such as trim, the sewing machine computer can be independently reprogrammed. When it is desired to change the pattern, the separate computer controlling the X-Y table movement direction can be independently reprogrammed. It is not necessary to reprogram both funcions which is an enormous task. Instead, only one of the functions needs to be reprogrammed, thereby greatly simplifying the process.

11 Claims, 3 Drawing Sheets

Fig. 1.
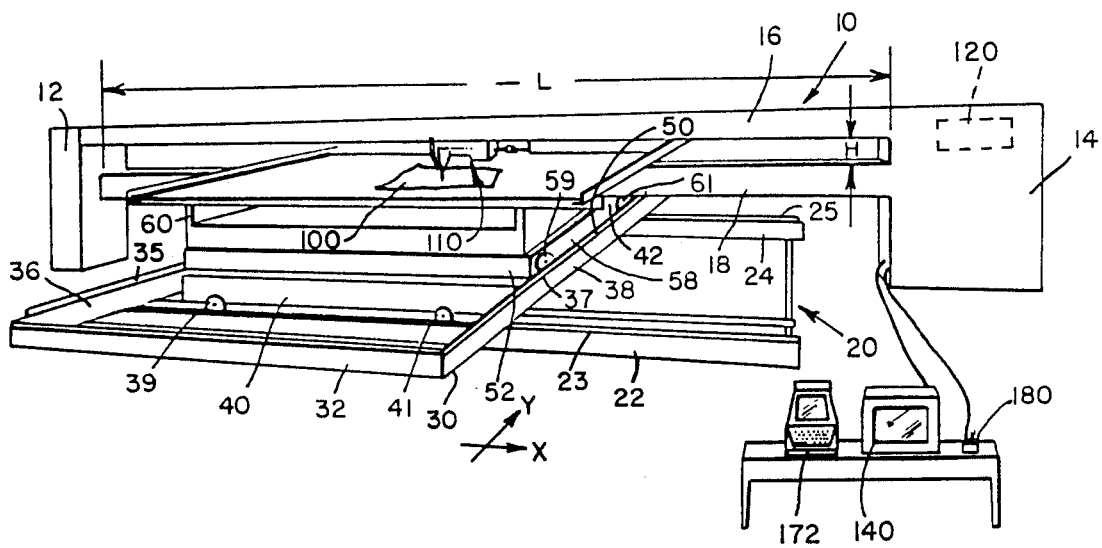
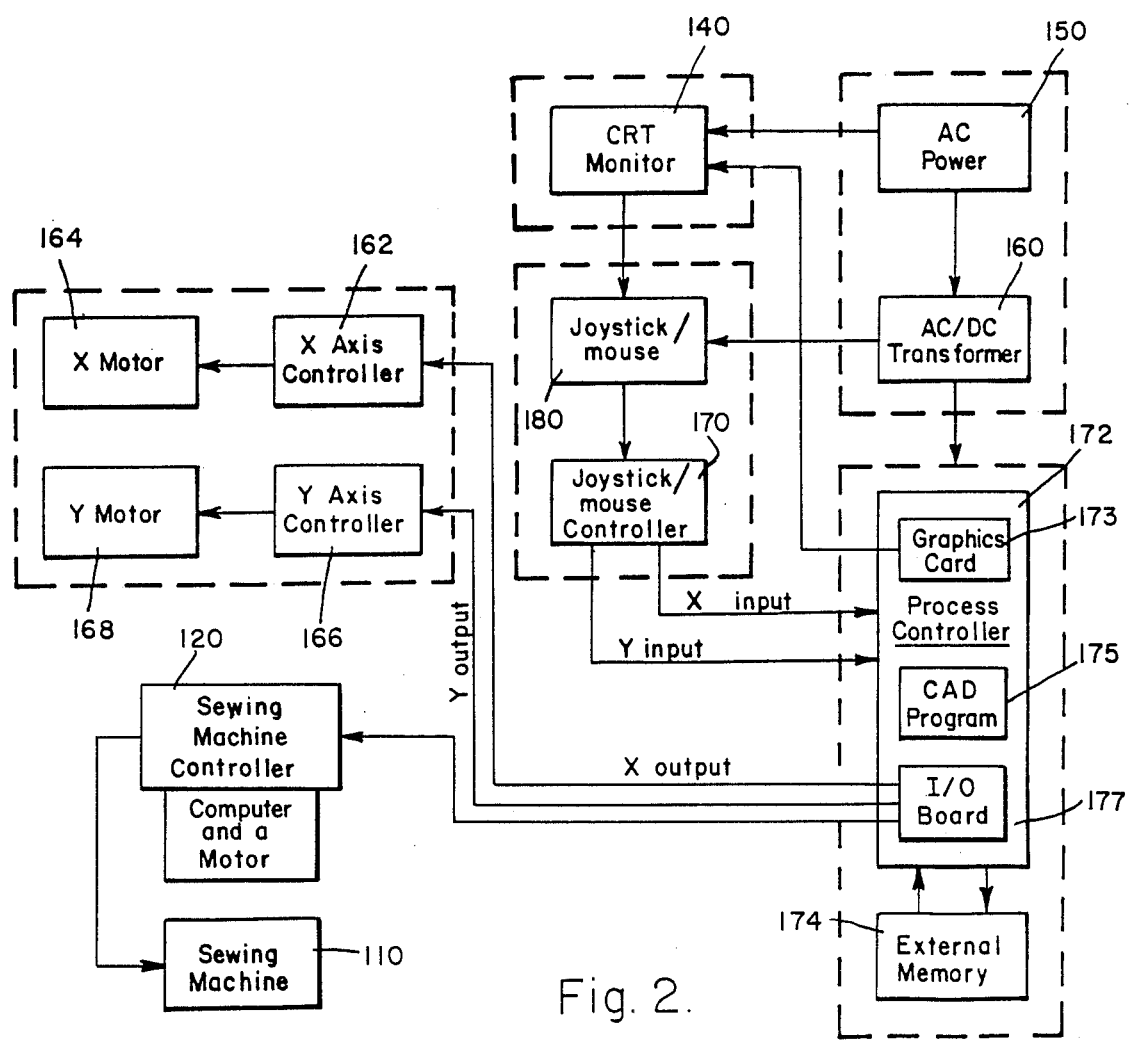
Fig. 2.

AUTOMATIC QUILTING MACHINE AND METHOD FOR SPECIALIZED QUILTING OF PATTERNS WITH SEPARATE COMPUTERS TO CONTROL THE STITCHING AND TABLE MOVEMENT FUNCTIONS

BACKGROUND OF THE INVENTION

1. Field of the Invention

The field of the present invention relates to frame quilting machines which are large table-like structures used to sew patterns into large textile items; in particular bedspreads and quilts. The field of the present invention also relates to industrial sewing machine apparatus and processes used to sew patterns and stitching into large fabrics, which sewing operation is not easily performed on conventional sewing machine. The field of the present invention also relates to machines which include a method of duplicating a selected pattern over an entire bedspread or quilt. Finally, the field of the present invention relates to computer controlled quilting machines wherein the stitching pattern of the sewing machine head and the table movement of the frame relative to the sewing machine head are both controlled by computers or process controllers.

2. Description of the Prior Art

Industrial sewing machine operations are known in the prior art. Patterns and stitching into fabrics is commonly performed on industrial sewing machines. The operator hand guides the fabric between the needle and the sewing machine table and the pattern is sewn into the fabric. This process is practical for small pieces of fabric and is commonly done on piece goods such as garments. When handling larger pieces of fabric such as a roll of fabric, a metnod known in the prior art is roll to roll sewing. The sewing machine head is located along an X-axis and the material is unwound from a roll and caused to move transverse to the sewing machine head such that the fabric moves along a Y-axis. The sewing machine sews a stitch into the large fabric as the head moving along the X-axis and the fabric moving along the Y-axis intersect each other. The fabric is then wound onto a second receiving roll.

When sewing a very large piece of fabric such as a bedspread or quilt, a frame quilting machine is used. The frame quilting machine comprises a large frame, usually made of metal, onto which the fabric to be sewn is spread. Commonly, the pattern is sewn by a sewing machine guided by a computer into which a predetermined pattern has been programmed. The fabric remains stationary on the frame and the sewing machine head moves along the fabric and stitches in the predetermined pattern.

The current method for computer programmable quilting patterns uses a digitizer/cursor board with a method of plotting patterns. It is also used in the design of patterns and is accomplished on a scaled down version of the patterns. Plotting is accomplished using a mouse for indexing points on an XY axis. The points are programmed and followed through use of the computer. The prior art uses standard patterns which are preprogrammed into the computer and selected individualized patterns which are created as the bedspread or quilt is on the machine.

A major problem with all prior art embodiments is that the stitching function of the sewing machine needle and the frame table movement in the X and Y directions are controlled by a single computer. As a result, when it becomes necessary to program or reprogram the machine for a new stitch or pattern, or to make modifications in the existing stitch or pattern, all of the movements in the stitch function and table movement function must be reprogrammed. This results in an enormous amount of work in that thousands of combined stitch and movement operations must be reprogrammed and the effort takes many hours and sometimes days.

The inventors have previously filed three patent applications which are presently co-pending. These patent applications are as follows:

1. Patent application Ser. No. 07/220,734 filed 07/18/88 for "Automatic Quilting Machine For Specialized Quilting Of Patterns Which Can Be Controlled By A Remote Joy Stick And Monitored On A Video Screen".

2. Patent application Ser. No. 07/247,696 filed 09/22/88 for "Automatic Quilting Machine For Specialized Quilting Of Patterns Which Can Be Controlled By A Remote Joystick And Monitored On A Video Screen Including Pattern Duplication Through A Reprogrammable Computer".

3. Patent application Ser. No. 07/336,007 filed 04/10/89 for "Automatic Quilting Machine For Specialized Quilting Of Patterns Which Can Be Created By A Scanner Or On A Video Screen Utilizing Computer Graphics In Conjunction With A Reprogrammable Computer Which Includes Computer Aided Design".

The prior art known to the inventors is discussed in the above three referenced patent applications. None of this prior art discloses the concept of separate computers or process controllers to control the sewing machine functions and the frame table movements so that each can be independently programmed or reprogrammed to make adjustments or changes in either the stitch or accessory functions such as trim, etc. or in the table movement in the X and/or Y direction.

Therefore, there is a significant need for a system which selectively breaks down the the three functions of sewing machine stitch pattern, X movement and Y movement into individualized computer program modes so that reprogramming of one element does not require reprogramming the entire system.

SUMMARY OF THE PRESENT INVENTION

The present invention relates to an automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction, either through a manually operated automatic joystick or mouse or through an automatic remote control directed by a computer. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head.

In addition, the present invention also relates to a reprogrammable function integrated into the system wherein the operator first manually draws the desired pattern on a monitor using conventional graphic systems apparatus such as a mouse. The tracing function is facilitated through a computer aided design program which automatically converts the drawn pattern into computer language which then can cause the stitch to be reprogrammed at any desired location on the fabric. An example of such a computer aided design program is AutoSketch-R or AutoCad-R which are federally registered trademarks of Autodesk, Inc. At the end of this step, the traced pattern is stored into the memory of the computer as a digitalized image of the pattern embodied in the computer aided design program. The computer aided design program then permits the patterns to be duplicated as often as desired after information concerning the dimension of the fabric and the desired locations for the repeated pattern are input into the computer program. At the end of this step, the computer will have generated and stored a digitalized map of the entire area to be quilted. In the third step of the process, the operator will command the start of the automated quilting generated process and the computer will cause the machine to to the marked locations in the computer which are comparable to the marked locations on the bedspread or quilt and repeat the individualized pattern which was created by the operator. The commands are placed into the remote control operation which causes the movement of the frame quilting table.

Further, the present invention also relates to a system wherein the sewing machine function is controlled by one computer usually connected to the sewing machine head and the quilting table motion in the X-direction, Y-direction, and X-Y direction is controlled by a separate computer. When it is desired to change a sewing machine computer function such as a stitch or accessory functions such as trim, the sewing machine computer can be independently reprogrammed. When it is desired to change the pattern, the separate computer controlling the X-Y table movement direction can be independently reprogrammed. It is not necessary to reprogram both functions which is an enormous task. Instead, only one of the functions needs to be reprogrammed, thereby greatly simplifying the process.

In general, this is a frame quilting machine. A bedspread, comforter, quilt, etc. is stretched securely on a metal frame. It is placed on an X-Y positioning table for movement controlled through a sewing machine. The sewing machine has been modified and mounted on a steel frame (two cross beams top and bottom) that can accommodate twelve feet by twelve feet six inches of stitching dimensions. Of course it can be made larger or smaller. The machine has been engineered and built to satisfy increased production needs of manufacturers who supply "customer, hand-guided, or outline quilted patterns". The key elements of the present invention are: (a) sewing and auxiliary functions; (b) the electronic coordination of movement and sewing speeds relative to direction and distance of travel of the remote control apparatus; (c) a reprogrammable computer into which the individualized pattern which can be converted into machine language by the computer aided design program of the computer can be programmed into the computer and after at least one point for each subsequent pattern duplication has been marked into the computer aided design computer program, the individualized pattern can be duplicated in each desired location of the bedspread or quilt through activation of the reprogrammable computer which commands the remote control apparatus to move the quilting table relative to the sewing needle; and (d) two separate computers, one which controls the sewing machine function and one which controls the table movement in the X-direction, Y-direction and combination X-Y direction.

It has been discovered, according to the present invention, that if a frame quilting machine can be moved relative to a fixed sewing machine head in the X-direction, the Y-direction or any X-Y combination direction by a remote operating means such as a computer, and the frame quilting machine comprises a metal table or frame on which a bedspread or quilt is stretched such that the surface area of the bedspread or quilt is open and unobstructed, and the metal frame can move relative to and between a pair of cross beams which hold a sewing machine head and plate, then an operator can cause a precise pattern to be programmed into the computer through the use of a computer aided design feature which converts the graphic picture pattern into machine readable language and is stored in the memory of the computer, which in turn through a remote control apparatus can cause the programmed pattern to be precisely stitched into the bedspread or quilt by moving the metal frame or quilting table relative to the fixed cross beams housing the sewing machine components in any desired direction to arrive at any desired location on the bedspread or frame where a stitch or pattern is to be sewn, and further the sewing function or the pattern through the table movement can be separately changed by reprogramming the sewing machine computer or the table movement computer separately.

It has further been discovered, according to the present invention, that if one computer controls the sewing function of the sewing machine and a second computer controls the movement of the quilting table, then reprogramming either computer is greatly simplified.

It is therefore an object of the present invention to provide an apparatus by which an operator can remain at a remote location from a large frame quilting machine and cause a precise pattern to be sewn into the large bedspread, comforter, quilt, or other fabric which is held on the metal frame or table of the frame quilting machine, through the use of a computer aided design feature in which the pattern can be drawn on a monitor by movement of a cursor which is guided by a remote movement apparatus such as a joystick or mouse and the drawn pattern can thereafter be automatically converted into machine readable language through use of a computer aided design program such as AutoSketch-R or AutoCad-R, which can automatically duplicate a graphic pattern into machine readable form. Thereafter, the pattern is stored in the memory of the reprogrammable computer and the pattern can be duplicated into the fabric through commands from the computer which guides a remote control apparatus which causes the frame quilting table to be moved relative to the sewing needle. If it is desired to change the pattern, the reprogrammable computer need only be reprogrammed to change the movement pattern of the table in the X-direction, Y-direction, and combination X-Y direction without having to also reprogram the sewing machine commands. If it is desired to change the sewing machine function, only the sewing machine function needs to be reprogrammed without having to also reprogram the frame table movement.

It is a further object of the present invention to provide an apparatus which can accommodate computerized pattern quilting of a predetermined computer generated pattern and also accommodate specialized hand selected patterns, or any combination thereof, in the same unit.

It is an additional object of the present invention to increase the rate of production of hand guided patterns sewn into large fabrics such as bedspread or quilts.

It is also an object of the present invention to provide a system for automatically duplicating the individualized patterns through a specialized computer aided design program or scanner, to thereby eliminate the necessity of using a digitizer/cursor board to individually record numerous plotted points of the pattern drawing and thereafter burn them into a E-Prom.

It is a further object of the present invention to provide a system wherein the computers which control the sewing machine function and the quilting table movement are segregated to thereby reduce the effort involved in reprogramming the computers.

Defined very broadly, the present invention is a method of repetitively sewing a pattern into a fabric having a large surface comprising: (a) positioning a sewing machine head having a source of thread and a sewing needle relative to said fabric; (b) retaining said fabric on a movable structure which can be made to move in a horizontal direction relative to the sewing needle and which can cause a portion of the surface of the fabric to be reached by the sewing needle so that thread can be sewn into the fabric; (c) causing said movable structure to move relative to the sewing machine through commands from a first process controller; and (d) causing said sewing machine head to perform stitching or alternative sewing machine functions from commands through a second process controller.

The present invention can also be defined as an apparatus for sewing thread into fabric, comprising: (a) a first structure supporting a sewing machine head having a sewing needle and a source of thread; (b) a second structure supporting the fabric in a position relative to said sewing needle so that thread may be sewn into the fabric; (c) said second structure capable of horizontal movement in the X-direction, the Y-direction, or any combination X-Y direction relative to said sewing needle; (d) means for generating the horizontal movement of said second structure in the X-direction, the Y-direction, or any combination X-Y direction; (e) a first process controller having an Input/Output board which is connected to said means for generating horizontal movement of said second structure and which processes commands for controlling movement of said second structure in the horizontal direction; (f) a second process controller connected to said sewing machine and which processes commands for controlling the sewing function of the sewing machine head, the second process controller also connected to said Input/Output board of said first process controller; and (g) said first process controller and said second process controller capable of being independently programmed so that programs and modifications to programs in one of the process controllers can be made independently of the other process controller.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

FIG. 1 is a perspective view a frame quilting machine, including a process controller with computer aided design program and a sewing machine with a separate computer.

FIG. 2 is a block diagram of the components of the electronic control components of the present invention automatic quilting machine including pattern duplication through a reprogrammable computer or process controller which comprises a computer aided design computer program for controlling frame table movement and a sewing machine with a separate computer or process controller.

DETAILED DESCRIPTION OF THE PREFERRED EMBODIMENT

Figure 3:
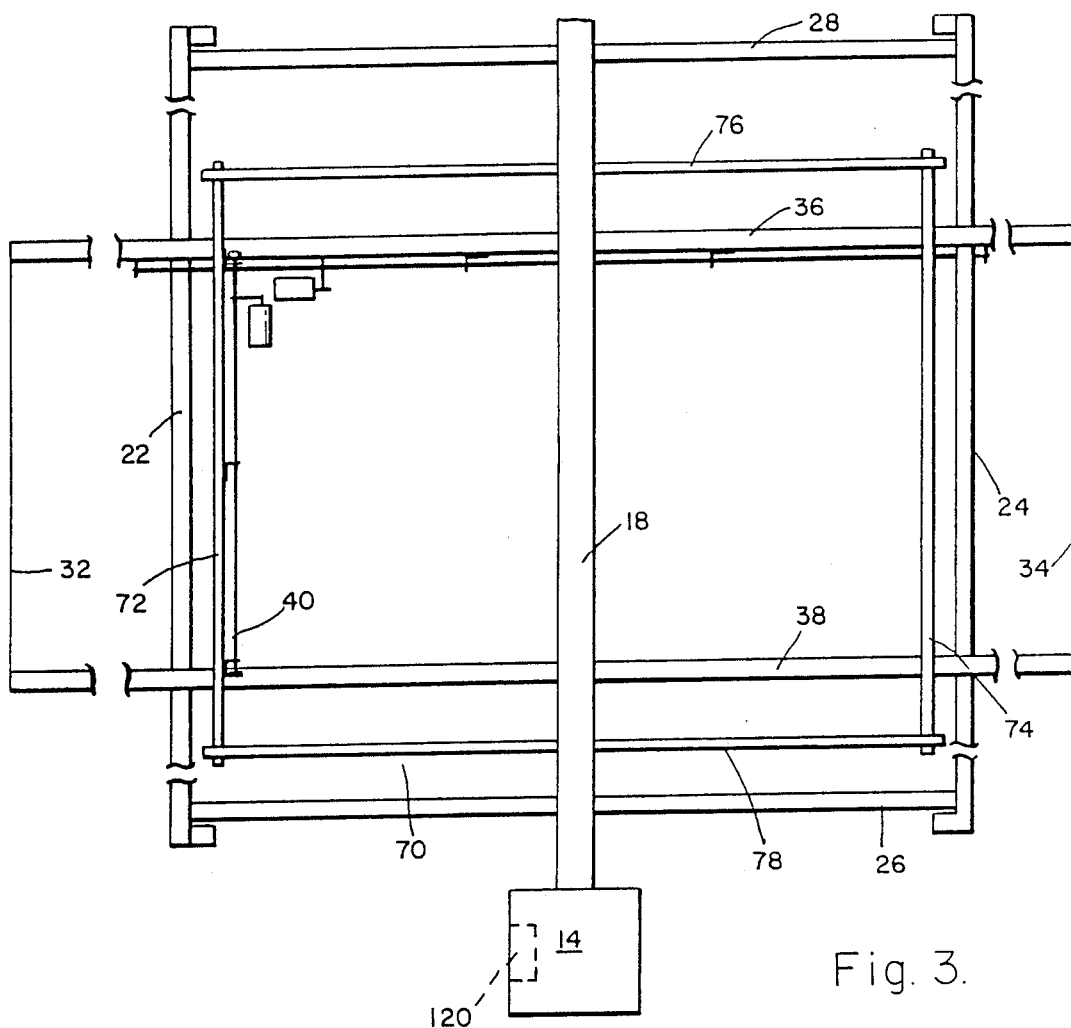
FIG. 3 is a top plan view of the main body of a frame quilting machine which includes the present invention of a separate process controller to control the table movement and a separate process controller to control sewing machine operation.

Although specific embodiments of the invention will now be described with reference to the drawings, it should be understood that such embodiments are by way of example only and merely illustrative of but a small number of the many possible specific embodiments which can represent application of the principles of the invention. Various changes and modifications obvious to one skilled in the art to which the invention pertains are deemed to be within the spirit, scope and contemplation of the invention as further defined in the appended claims.

Referring to FIG. 1, the main structural elements of the automatic frame quilting machine for specialized quilting of patterns including pattern duplication through a reprogrammable computer which may comprise a computer aided design computer program (hereinafter referred to as "automatic quilting machine") will be discussed first. The entire automatic quilting machine is designated as 10. The main structural member of the automatic quilting machine 10 is a pair of posts or box members, comprising a left box member 12 and a right box member 14. By way of example, the left box member 12 which serves only as a support member can be made of quarter inch plate steel and can have a base which is twenty inches wide by twenty-four inches deep and fifty-two inches tall. The right box member 14 which includes the electronics and motors, as will be described later, in addition to acting as a support member, can also be made of quarter inch plate steel and can have a base which is forty-four inches wide by twenty-four inches deep and fifty-two inches tall. The two support boxes 12 and 14 support a pair of cross beams; an upper cross beam 16 and a lower cross beam 18. Upper cross beam 16 can be made of quarter inch plate steel and can be twenty-four feet long, four inches wide and eight inches tall. Lower cross beam 18 can be made of quarter inch plate steel and can be twenty-four feet long, eight inches wide and eight inches tall. As illustrated in FIG. 1, the two beams 16 and 18 run parallel to each other between support box members 12 and 14, and are separated by a gap "H" which by way of example may be nine and a half inches. The cross beams 16 and 18 are permanently attached to the supporting box members 12 and 14 by conventional means such as welding.

Referring to FIGS. 1 and 3, on the ground between the supporting box members 12 and 14 and beneath the lowermost cross beam 18 is the base track 20. The base track 20 is comprised of track supports 22 and 24 which support thereon a gear and rack system which will be described in greater later on. Track support 22 further comprises a track 23 on which a pair of rollers may roll. Track support 24 further comprises a track 25 on which a pair of rollers may roll. The track supports 22 and 24 are aligned parallel to each other and are attached by means of transverse spacing members 26 and 28 which also run parallel to each other, thereby forming a generally square base which rests on the ground. Resting immediately above the base track 20 is a first movable support member track 30. The first movable support member track 30 is comprised of a pair of parallel X-direction beams 32 and 34 and a pair of Y-direction beams 36 and 38 which are connected together to form a generally rectangular frame. The frame comprised of members 32, 34, 36 and 38 of first movable support members 30 supports transverse roller member 40 and 42. Transverse roller member 40 is supported between Y direction beams 36 and 38 and is generally parallel to X-direction beams 32 and 34 and is aligned directly over track support 22. Transverse roller member 40 further comprises a pair of rollers 39 and 41. Transverse roller member 42 is supported between Y-direction beams 36 and 38 and is generally parallel to X-direction beams 32 and 34 and is aligned directly over track support 24. Transverse roller member 42 further comprises a pair of rollers (not shown). First movable support track 30 can move in the X direction as the rollers on transverse roller members 40 and 42 can roll on the track 23 contained on track support 22 and on track 25 contained on track support 24 respectively. Y-direction beam 36 further comprises a track 35 and Y-direction beam 38 further comprises a track 37. Y-direction beams 36 and 38 further comprise gear and rack assemblies, as will be described later.

Resting immediately above the first movable support member track 30 is a second movable support member track 50. The second movable support member track 50 is comprised of a pair of parallel X-direction beams, one of which is shown at 52 and a pair of Y direction beams, one of which is shown at 58, which are connected together to form a generally rectangular frame. The Y-direction beams on the second movable support member track 50 each further comprise a pair of rollers which enable the second movable support track 50 to move in the Y-direction. Y-direction beam 58 comprises a pair of rollers 59 and 61 which move on track 37 and Y-direction beam 56 comprises a pair of rollers (not shown) which move on track 35.

Second movable track member 50 further comprises four posts at its corners, two of which, 60 and 62 are shown in FIG. 1. The four posts support quilt table 70 which is comprised of X-direction table beams 72 and 74 and Y-direction table beams 76 and 78, connected together by means such as welding. X-direction table beam 72 is supported on posts 60 and 62 and X direction table beam 74 is supported on the two opposite posts (not shown). Y-direction table beams 76 and 78 are supported on the two X-direction table beams 72 and 74 adjacent their respective ends, as shown in FIGS. 1 and 3. The two X-direction table beams 72 and 74 are parallel to each other and the two Y-direction table beams 76 and 78 are parallel to each other.

As illustrated in FIGS. 1 and 3, the posts on second movable track member 50 support the table beams such that the table beams 76 and 78 pass through gap H between cross beams 16 and 18 and table beams 72 and 74 can pass through the gap H if the Y direction movement is of sufficient length. In operation, a bedspread or quilt 100 is stretched across the table beams 72, 74, 76, and 78, which by way of example can form a table surface of approximately twelve feet in the X-direction by twelve and a half feet in the Y-direction, such that the quilt 100 is supported at its edges by the four table beams 72, 74, 76 and 78 which result in a fully accessible quilt over its entire interior upper and lower surface. The table beams are caused to move in the X-direction by first movable support track 30 as the rollers on transverse roller members 40 and 42 move along tracks 23 and 25 respectively. The length "L" of gap "H" is preferably at least twice the length of the two X-direction table beams 72 and 74. In this way, the entire X-direction area of the quilt table 70 can be reached by the centermost position along the cross beams 16 and 18. The table beams are caused to move in the Y direction by second movable support member track 50 when the rollers on its Y-direction beams move along tracks 35 and 37. The length of tracks 35 and 37 is at least twice the length of the two Y-direction table beams 76 and 78. In this way, the entire Y-direction area of the quilt table 70 can be reached by the centermost position along the cross beams 16 and 18. Through this combination of X and Y movements, the entire area of the quilt table 70 and the quilt 100 spread thereon can be reached by the centermost position of cross beams 16 and 18. In the preferred starting position, the quilt table 70 is centered relative to the cross beams 16 and 18 and can move in any X-Y direction relative the the centermost position of the cross beams.

Figure 4:
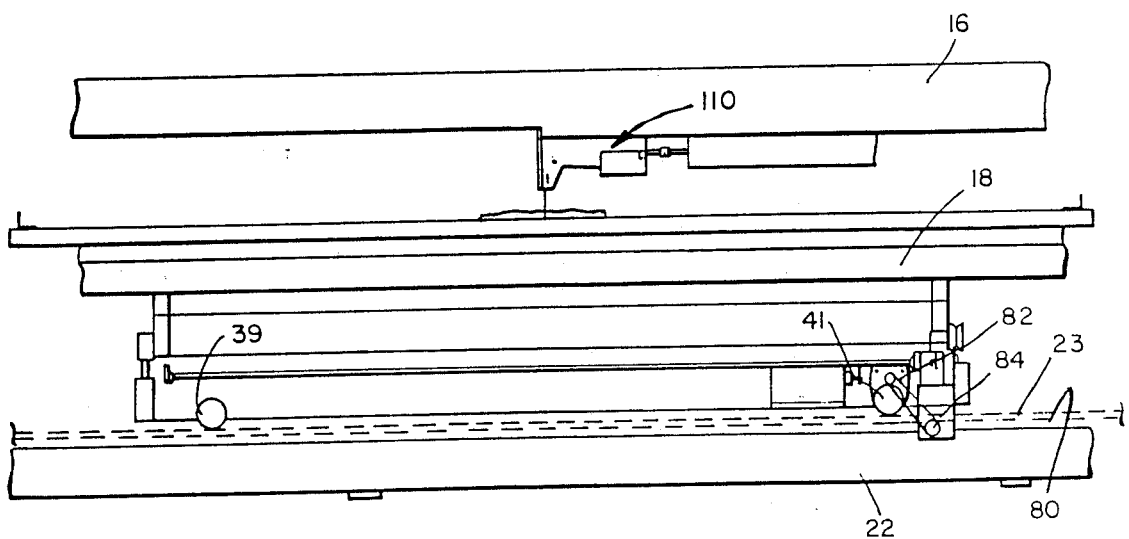
FIG. 4 is a front elevational view of a frame quilting machine which includes the present invention of a separate process controller to control the table movement and a separate process controller to control sewing machine operation.

The quilt table 70 can be caused to move in the X and Y directions as previously described by numerous conventional types of means, such as a gear and rack assembly. One such gear and rack assembly is illustrated in FIG. 4. Track support 22 supports track 23 on which rollers 39 and 41 can roll in the X-direction. Track support 22 further contains on its interior surface a rack assembly 80 having a conventional multiplicity of teeth which can accommodate a gear. Transverse roller member 40 further supports a rotatable gear 82 which is caused to rotate by a conventional gear drive mechanism 84 having smaller gears driven by a belt to drive the rotatable gear 82. The gear drive mechanism is driven by a conventional linkage hookup to a drive motor which causes a motor shaft to rotate and thereby drive the gear drive mechanism 84 which in turn causes the rotatable gear 82 to rotate. When the rotatable gear rotates in the clockwise direction, the rotatable gear moves along the rack assembly 80 and causes the transverse roller member 40 (and opposite transverse roller member 42) to move to the right in the X-direction. When the rotatable gear rotates in the counterclockwise direction, the rotatable gear moves along the rack assembly 80 and causes the transverse roller member 40 (and opposite transverse roller member 42) to move to the left in the X-direction. It will be appreciated that a comparable rack and gear assembly is supported on Y-direction beam 38 and Y-direction beam 58, thereby enabling Y-direction beams 58 (and the opposite Y-direction beam on second movable support member track 50) to move back and forth in the Y-direction.

It will be appreciated that conventional adjustment modifications can be incorporated into this system. For example the overall height of the quilt table 70 can be adjusted up and down by creating slidable adjustments in the the posts (60, 62 and to two opposite posts) in order to adjust the height of quilting table 70 relative to the cross beams 16 and 18.

Figure 5:
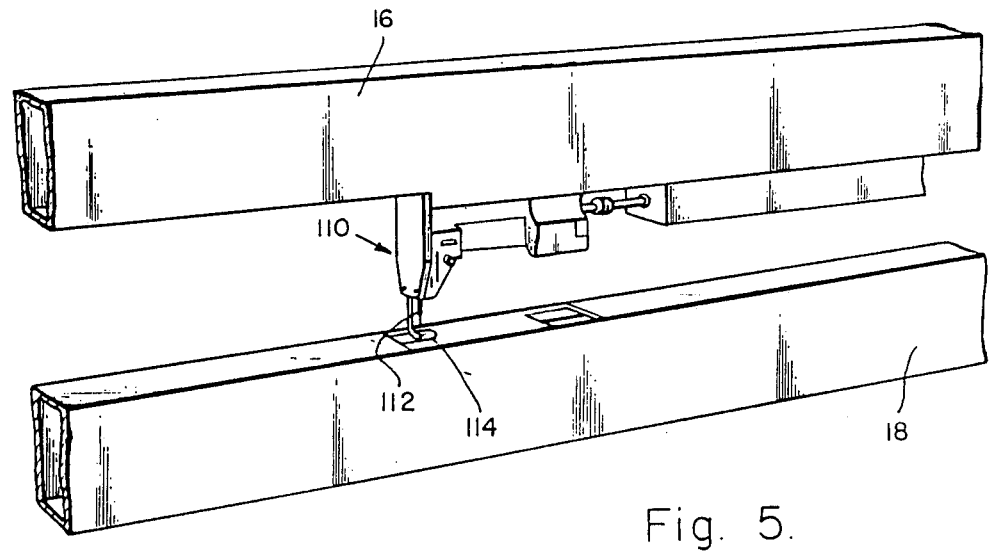
FIG. 5 is an enlarged perspective view of the front portion of the main support bean of the frame quilting machine.
Figure 6:
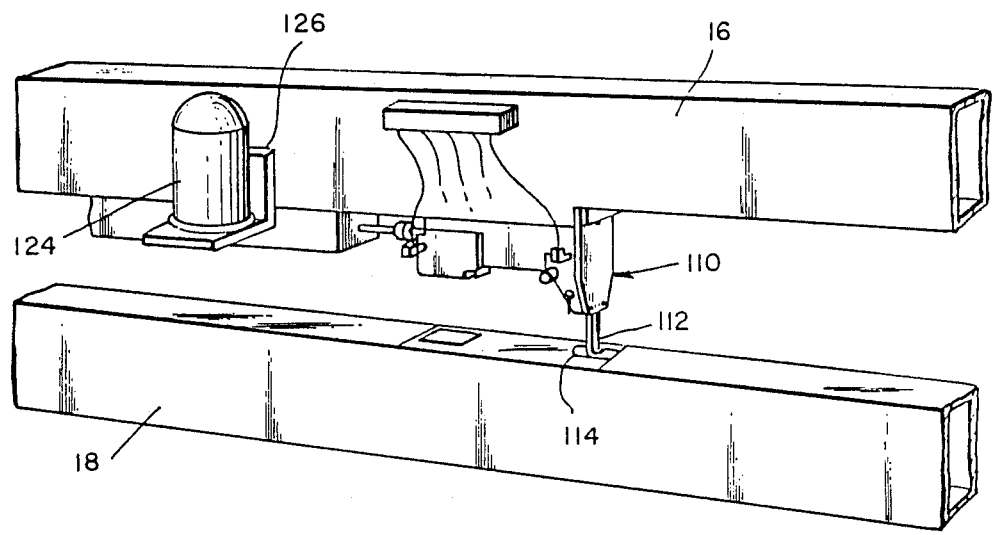
FIG. 6 is an enlarged perspective view of the rear portion of the main support beam of the frame quilting machine and attachments thereto.

Referring to FIGS. 4, 5, and 6, a sewing machine head 110 is bolted stationary to upper cross beam 16. To achieve the goal of the present invention in segregating the computer controlling the sewing functions from the computer controlling the quilting table movement, it is required that a sewing machine head having its own computer 120 be used. As illustrated in the block diagram of FIG. 2 and also in FIG. 6, the sewing machine 110 has attached to it a separate process controller or computer 120 which received input from the process controller of the frame quilting machine and thereafter feeds the commands to the sewing machine 110. This will be discussed in greater detail later on. By way of example, one type of sewing machine head which can be used with the present invention is the Mitsubishi Industrial Sewing Machine Model LS2-180 high speed, single needle lockstitch sewing machine. A microprocessor connected to this type of sewing machine head provides many auxiliary functions such as control of needle position, presser foot lift, undertrim, and tension release disk. The sewing machine head 110 is attached to the underside of upper cross beam 16 such that the sewing needle 112 is at the approximate center of cross-beam 16. In this manner, the sewing needle 112 can reach any portion of the quilt table 70 and quilt 100 thereon by the X-Y movement of the quilt table, as previously discussed. The sewing machine plate 114 is formed into the top of lower cross beam 18 such that the plate 114 is aligned with the needle 112, as best illustrated in FIG. 6.

A bobbin 124 is supported by a frame member 126 attached to one edge of upper cross beam 16. Thread 128 is wound on the bobbin 118 and is guided by conventional means through the sewing machine head 110 and to the needle 112.

While it would be possible to physically move the quilting table 70 as the needle is sewing the pattern, it is not practical since the table is heavy and could not be moved fast enough by hand to quickly guide the portion of quilt 100 to the area where the sewing needle 112 is sewing the next stitch. Therefore, an automatic electrical system for moving the quilting table 70 and quilt 100 thereon into position for appropriate sewing of the pattern is required. A block diagram of the electronics for performing this operation is presented in FIG. 2. A source of alternating current power 150 energizes the entire system. In one connection, the source of alternating current power 150 is connected to a monitor 140. In a second connection, the alternating current source is connected to an alternating current to direct current transformer 160. The transformer 160 is in turn connected to a process controller or computer 172 which provides control functions for movement of the quilting table beams in the X-direction, the Y-direction, and therefore the X-Y direction for subsequent duplication of the pattern as will be discussed hereafter. The AC to DC transformer 160 is also connected to a remote control apparatus such as a joystick or mouse 180 which in turn is connected to a control 170. The controller 170 has an X-axis input and a Y-axis input into the process controller or computer 172. The process controller 172 has an Input/Output (hereinafter "I/O") Board 177 which connects the process controller to an X-output and a Y-output. The X-output of the I/O Board 177 is connected to an X-axis controller 162 which in turn is connected to the X direction motor 164 which is a direct current motor. The I/O Board 177 of process controller 172 also has a Y-direction output which in turn is connected to a Y-axis controller 166 which in turn is connected to the Y direction motor 168 is which a direct current motor. In the block diagram of FIG. 2, the process controller 172 is also shown connected to an external memory 174. It is also within the spirit and scope of the present invention for the process controller to have an internal memory. Included within the process controller 172 is a graphics card 173 through which the process controller 172 is connected to the monitor 140. The process controller 172 may also be programmed through floppy disks or a hard disk with a computer aided design ("CAD") program 175.

Through use of the process controller 172, its graphics card 173 and the CRT monitor 140, a pattern may be drawn through use of the Joystick/Mouse 180 and drawn on the CRT Monitor 140. Thereafter the pattern is programmed into the process controller 172 through programming means such as a Computer Aided Design Program 175. The process controller 172 through the I/O Board 177 puts out RPM Commands through its X-output and Y-output to direct the X-axis controller 162 and Y-axis controller 166 to cause the X-axis motor 164 and Y-axis motor to run at certain RPM's and move the quilting table 70 is the desired pattern direction. The I/O Board 177 of the process controller 172 is also connected to the separate sewing machine controller 120. The process controller 172 through its I/O Board 177 sends out voltage commands to the sewing machine process controller 120. Typically, the voltage commands are from 0 to 10 volts. Upon receiving the voltage command, the sewing machine process controller converts them into RPM commands and directs the sewing machine 110 to perform either stitching functions or else to perform auxiliary functions such as trim, tension open disk, foot lift, etc. The critical element in the present invention concept is that the movement of frame quilting table 70 is controlled by one process controller 172 while the sewing machine 110 is controlled by its separate process controller 120. If it is desired to reprogram the pattern being sewn or to make a modification in the existing pattern, which therefore requires a program modification to change the commands which cause the frame quilting table 70 to move in a given set of directions relative to the sewing machine head 110, it is only necessary to reprogram the process controller 172 to change the movements of the frame quilting table 70. It is not necessary to also reprogram the stitching functions of the sewing machine process controller 120 or the sewing machine 110. Therefore, instead of having to reprogram all of the combinations of table movement and stitches to be made to correspond to the table movement which can take many hours and sometimes days to complete, it is only necessary to reprogram the table movement into the machine process controller 172 and thereafter this process controller 172 sends its voltage commands to the sewing machine process controller 120 which in turn commands the sewing machine 110 to perform either stitching functions or auxiliary functions. The CAD Program 175 is one of the types of computer programs which can be used with the present invention.

The frame quilting table 70 can be programmed to move in any desired direction and variable speeds so that high-speed and low-speed moves can be programmed from the process controller 172. By way of example, the high-speed may be set to a maximum diagonal speed of approximately twenty-five feet per minute. Limit switches may be included to prevent the table's overtravel. The DC motors 164 and 168 may be variable speed motors which are coupled to the quilt table through conventional drive belts, gears and racks, as previously described. The mechanical portion of the drive system can be suitable for adaptation to a computer controlled servo system and can therefore be controlled by the process controller 172. The electronic control components including the AC to DC transformer 160, the X-axis controller 162, the Y-axis controller 166, the X-direction motor 164, the Y-direction motor 168 and the controller 170 can all be housed in the larger supporting box member 14. In the illustration of FIG. 1, the process controller 172 is shown adjacent the monitor 140. It is also possible to house the process controller 172 and its external memory 174 within larger supporting box member 14. In the preferred embodiment, the sewing machine controller 120 is also housed within larger supporting box member 14 and connected to the sewing machine 110 through wires extending through the upper cross beam 16 and/or lower cross beam 18.

An improvement which may be used in conjunction with the present invention two computer or process controller system is a computer aided design system for creating the pattern which will be sewn by the frame quilting machine. The individual can select a pattern which is to be sewn into the machine. The pattern can be hand drawn onto the monitor 140 through use of a cursor moving apparatus such as a mouse 170. The cursor moving apparatus 180 can hand drawn the pattern onto the monitor 140 and the individual can make any number of modifications and selections so that a hand designed pattern can be completely drawn on the monitor 140. After the hand drawn pattern has been drawn onto the monitor 140, the operator feeds the drawing data into the computer aided design program 175 which automatically converts the drawn graphic image into machine readable form. In the event modifications are required, the graphic pattern can be called up on the monitor 140 and the required changes made by movement of the cursor through the mouse 170 until the modified pattern has been achieved. Then the pattern is once again fed through the computer aided design program 175 and converted into machine readable form. In addition, the operator can select a grid on the monitor 140 and program a point from the graphic pattern at each location on the grid where the pattern is to be duplicated. This information can also be fed into the computer aided design program and stored. Therefore, the process controller can automatically direct the frame quilting table to move in the desired X, Y, or X-Y direction to automatically sew the programmed pattern into the fabric 100 and to cause the pattern to be duplicated on the points as marked on the computer monitor grid. Commands are fed from the I/O Board 177 of the process controller 172 through the X-axis output to the X-axis controller 162 to the X motor 164, and from the I/O Board 177 of the process controller 172 through the Y-axis output to the Y-axis controller 166 to the Y motor 168. Therefore, the present invention of two separate computers used in frame quilting can be combined with a computer aided design program (which by way of example can be an AutoSketch-R or an Auto-Cad-R program) so that individualized patterns can be hand drawn on the computer monitor and automatically converted into machine readable language from which the process controller can automatically sew the pattern into the fabric (such as a quilt or bedspread) and further duplicate the pattern at any multiplicity of desired locations.

By way of example the computer aided design program 175 can be the AutoSketch-R program. The AutoSketch R program is a full-function computer-aided design package for generating line art. The drawing is created using a mouse and menus which have therein various shapes such as lines, arcs, circles, points, polygons and spline curves (spline curves are curves fitted to a frame of control points which have been specified). After the drawing has been made, the drawing can be duplicated at any desired location and in any manner. The drawings can be enlarged to add fine points or otherwise modified to suit the final desired pattern.

The key design element of the present system is that the process controller 172 which controls the X-Y movement of the quilting table and the trace pattern which is stored in the computer's memory as a computer aided design pattern is separate from the computer on the sewing head 110 which controls the sewing needle stitch and speeds. This is accomplished by using a sewing head which has its own independent computer such as a Mitsubishi Industrial Sewing Machine Model LS2-180 high speed, single needle lockstitch sewing machine. In this way, if it is necessary to add new stitch patterns into memory, it is a much simpler task to add the new stitch and program commands to the process controller 172 without also having to reprogram the stitching and other needle functions on the sewing machine head.

Because of the independent computer capability of the machine with one computer controller the X-Y movement and a second computer on the sewing machine controlling the sewing and stitching functions, the operator can trace a straight line pattern into the X-Y process controller 172 and a software program command to the X-Y process controller 172 will enable the pattern to be automatically modified into a zig-zag or any other desired pattern. This is a valuable modification which cannot be easily achieved with prior art systems where the computer for the sewing machine and X-Y movement is integrated into one large computer. The software program for such prior art systems is too complicated. In such prior art systems, each stitch and each movement for each stitch would need to be programmed. In the prior art you have for example 5 stitches per inch and 4,000 linear inches per fabric so 20,000 stitches and movements per stitch must be programmed. With the present invention, only the table movement needs to be programmed because the stitch pattern is a separate independent program controlled by a separate computer on the sewing machine.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A frame quilting machine comprising:
   a. a frame member for retaining a fabric;
   b. said frame member mounted on a structure which can be moved in the X-direction, the Y-direction, or any X-Y combination direction;
   c. a first cross beam extending horizontally over said frame member;
   d. a second cross beam aligned parallel to said first cross beam and extending horizontally beneath said frame member;
   e. a first motor to generate movement of said frame member in the X-direction;
   f. an X axis controller connected to said first motor;
   g. a second motor to generate movement of said frame member in the Y-direction;
   h. a Y axis controller connected to said second motor;
   i. a first process controller having an Input/Output board having an X-output connected to said X-axis controller and a Y-output connected to said Y-axis controller to thereby process commands to enable the frame member and the fabric retained thereon to be moved horizontally in the X-direction, the Y-direction, and any combination X-Y direction between said first cross beam and said second cross beam;
   j. a monitor;
   k. a sewing machine head attached to said first cross beam and having a source of thread;
   l. a sewing needle extending from said sewing machine head and positioned to sew threads into said fabric while the frame member and structure move underneath said first cross beam and above said second cross beam;
   m. a sewing machine plate attached to said second cross beam and aligned with said sewing machine head and sewing needle;
   n. said monitor and said process controller connected to a source of power;
   o. said first process controller further comprising a graphics card to enable commands from the process controller to be viewed on said monitor;
   p. a graphic movement apparatus which enables a graphic cursor to draw patterns on said monitor;
   q. said first process controller further comprising a memory to store machine readable patterns;
   r. said first process controller programmed with a computer aided design program which comprises menus of selected shapes which can be viewed on said monitor and used to sketch all or a portion of a desired pattern to be sewn into said fabric; and
   s. a second processor controller connected to said sewing machine head for processing sewing function commands to the sewing machine head, the second process controller also connected to said Input/Output board of said first process controller;
   t. whereby an operator may draw a pattern on said monitor through use of the graphic movement apparatus combined with the computer aided design program, convert the pattern into machine readable language through the computer aided design program, store the pattern in machine readable language in the memory of the computer and cause the pattern to be duplicated on the fabric through commands from the process controller to the X-axis controller and Y-axis controller which causes said frame member to move relative to said first and second cross-bream to thereby bring locations on the fabric into alignment with said sewing needle as the pattern is sewn into said fabric, and new programs for the frame movement can be programmed into said first process controller independently of reprogramming the second process controlled and new sewing machine commands can be programmed into said second process controller independently of said first process controller.

2. An apparatus in accordance with claim 1 wherein said first process controller generates RPM commands to said X-axis controller and said Y-axis controller and said first process controller generates voltage commands to said second process controller which in turn generates RPM commands to said sewing machine head.

3. An apparatus in accordance with claim 1 wherein said second process controller further comprises a computer and a motor for moving the sewing needle of the sewing machine head.

4. An apparatus in accordance with claim 1 wherein an operator can trace a straight-line pattern into the first process controller and a software program in the first process controller combined with the second process controller will enable the pattern to be automatically modified into a zig-zag or any other desired pattern.

5. An apparatus in accordance with claim 1 wherein said source of power is an alternating current source which is connected to an alternating current to direct current transformer before connection to said first process controller.

6. An apparatus in accordance with claim 1 wherein said fabric is a bedspread.

7. An apparatus in accordance with claim 1 wherein said fabric is a quilt.

8. An apparatus for sewing thread into fabric, comprising:
   a. a first structure supporting a sewing machine head having a sewing needle and a source of thread;
   b. a second structure supporting the fabric in a position relative to said sewing needle so that thread may be sewn into the fabric;
   c. said second structure capable of horizontal movement in the X-direction, the Y-direction, or any combination X-Y direction relative to said sewing needle;
   d. means for generating the horizontal movement of said second structure in the X-direction, the Y-direction, or any combination X-Y direction;
   e. a first process controller having an Input/Output board which is connected to said means for generating horizontal movement of said second structure and which processes commands for controlling movement of said second structure in the horizontal direction;
f. a second process controller connected to said sewing machine and which processes commands for controlling the sewing function of the sewing machine head, the second process controller also connected to said Input/Output board of said first process controller;
g. said means for generating horizontal movement of the second structure further comprising,
  (i) a first motor to generate movement of said second structure in the X-direction,
  (ii) an X-axis controller connected to said first motor and also connected to an X-input from said Input/Output Board in said first process controller,
  (iii) a second motor to generate movement of said second structure in the Y-direction,
  (iv) a Y-axis controller connected to said first motor and also connected to a Y-input from said Input/Output board in said first process controller;
h. said first process controller and said second process controller capable of being independently programmed so that programs and modifications to programs in one of the process controllers can be made independently of the other process controller; and
i. said first process controller generates RPM commands to said X-axis controller and said Y-axis controller and said first process controller generates voltage commands to said second process controller which in turn generates RPM commands to said sewing machine head.

9. An apparatus in accordance with claim 8 wherein said first process controller further comprises a computer aided design program.

10. An apparatus in accordance with claim 8 wherein said second process controller further comprises a computer and a motor for moving the sewing needle of the sewing machine head.

11. An apparatus for sewing thread into fabric, comprising:
a. a first structure supporting a sewing machine head having a sewing needle and a source of thread;
b. a second structure supporting the fabric in a position relative to said sewing needle so that thread may be sewn into the fabric;
c. said second structure capable of horizontal movement in the X-direction, the Y-direction, or any combination X-Y direction relative to said sewing needle;
d. means for generating the horizontal movement of said second structure in the X-direction, the Y-direction, or any combination X-Y direction;
e. a first process controller having an Input/Output board which is connected to said means for generating horizontal movement of said second structure and which processes commands for controlling movement of said second structure in the horizontal direction;
f. a second process controller connected to said sewing machine and which processes commands for controlling the sewing function of the sewing machine head, the second process controller also connected to said Input/Output board of said first process controller;
g. said first process controller and said second process controller capable of being independently programmed so that programs and modifications to programs in one of the process controllers can be made independently of the other process controller; and
h. wherein an operator can trace a straight-line pattern into the first process controller and a software program in the first process controller combined with the second process controller will enable the pattern to be automatically modified into a zig-zag or any other desired pattern.

* * * * *